US010698076B2

United States Patent
Jones et al.

(10) Patent No.: US 10,698,076 B2
(45) Date of Patent: Jun. 30, 2020

(54) RADIO FREQUENCY SIGNAL TRANSMISSION DETECTOR AND LOCATOR

(71) Applicants: Charles M. Jones, Woodridge, IL (US); Kenneth J. Zdunek, Schaumburg, IL (US)

(72) Inventors: Charles M. Jones, Woodridge, IL (US); Kenneth J. Zdunek, Schaumburg, IL (US)

(*) Notice: Subject to any disclaimer, the term of this patent is extended or adjusted under 35 U.S.C. 154(b) by 0 days.

(21) Appl. No.: 16/052,942

(22) Filed: Aug. 2, 2018

(65) Prior Publication Data
US 2020/0041606 A1 Feb. 6, 2020

(51) Int. Cl.
*G01S 5/04* (2006.01)
*G01S 5/02* (2010.01)
*H04W 4/021* (2018.01)

(52) U.S. Cl.
CPC .............. *G01S 5/04* (2013.01); *G01S 5/0221* (2013.01); *G01S 5/0252* (2013.01); *H04W 4/021* (2013.01)

(58) Field of Classification Search
CPC ......... G01S 5/04; G01S 5/0221; H04W 4/021
USPC ................... 342/451, 175, 188, 195
See application file for complete search history.

(56) References Cited

U.S. PATENT DOCUMENTS

| 7,804,448 | B2* | 9/2010 | Bull | G01S 5/06 342/357.31 |
| 8,240,238 | B2* | 8/2012 | Willner | F42B 33/06 89/1.13 |
| 8,866,672 | B2 | 10/2014 | Stroud | |
| 9,337,889 | B1 | 5/2016 | Stapleford | |
| 9,529,360 | B1 | 12/2016 | Melamed et al. | |
| 9,584,252 | B1* | 2/2017 | Salyers | H04K 3/80 |
| 2015/0276920 | A1* | 10/2015 | Kim | G01S 7/354 342/188 |

* cited by examiner

Primary Examiner — Bo Fan

(57) ABSTRACT

The present invention is a system and method for detecting and locating the transmission of radio frequency signals from within a defined geographical area. The system uses statistical confidence limits to detect outliers caused by transmissions in the defined geographical area. The source of the transmission can then be located with triangulation.

8 Claims, 18 Drawing Sheets

RADIO FREQUENCY SIGNAL TRANSMISSION DETECTOR AND LOCATOR

BACKGROUND

The rapid increase in small drone aircraft has introduced many beneficial applications of the technology. However, as with many new technologies, some malevolent activities emerge. Examples of these problematic activities are the flying of drones near airports and near prisons. The airport problem includes hobbyists that are unaware of the drone flying restrictions. The airport problem also includes terrorists attempting to fly drones into the engines of commercial and military airplanes in order to cause the airplane to crash. The prison problem includes individuals attempting to fly contraband (such as drugs or cell phones) over prison walls to a waiting prisoner. The present invention is a system and method to detect and locate a hostile signal transmitter when operating in a pre-defined geographical area for, as an example, the airport problem and the prison problem.

PRIOR ART

The following is a tabulation of some prior art that presently appears relevant in the radio frequency domain such as, for example, the airport and prison problems.

The literature describes many approaches to detecting a radio frequency (RF) transmitter by scanning for signals from one or more scanning means and using triangulation to then pinpoint the location of the transmitter. One application for this technology is to locate drones.

U.S. Pat. No. 9,529,360 focuses on "creating an override signal . . . " to "defeat" the drone. It goes on to claim (in claim 11) to transmit " . . . at least one pulse of 2.4 GHz energy from a magnetron source through an alternate antenna system, if no discernible effect can be detected." i.e. if the system fails to detect a drone. Claim 7 also claims to determine if the drone control signal is a frequency hopping spread spectrum signal (FHSS) protocol without describing how they accomplish this feat.

WO 2016144808 describes "scanning a region of airspace with two scanning apparatuses, each scanning apparatus comprising one or more directional RF antennae, the two scanning apparatuses having different locations; receiving radio frequency signals emitted by a UAV at each of the two scanning apparatuses; and processing the received radio frequency signals to determine a first location of the UAV". This teaching also assumes that the signals emitted from the UAV are detectable from within the background noise. They do not describe detecting a signal from a control transmitter. Nor do they describe detecting stealth UAVs that does not emit any signals. They do not describe detecting the protocol of the transmitted signal such as DSSS and FHSS signals which are designed to mask themselves in the background noise.

U.S. Pat. No. 8,240,238 describes a method for detecting RF signals from a static transmitter that involves mounting a scanner with a directional antenna on their own drone and detecting a series of signals from different drone positions which would allow them to triangulate to an approximate location of the static transmitter. They then send a jamming signal to neutralize the transmitter or to detonate it with explosive devices. They do not discuss background noise issues or transmission protocol issues.

U.S. Pat. No. 8,866,672 describes using a time difference of arrival (TDOA) method for locating a transmitter. It involves transmitting a signal from a known location to use as a time standard of comparison for the signal from the unknown location. The method assumes that the signal can be detected over background noise. The method does not discuss the problems with detecting various signal protocols such as DSSS and FHSS.

U.S. Pat. No. 7,804,448 describes a method of using a portable geolocation sensor at a first location and then moving it to a second location to detect the same RF transmission and using triangulation to locate the transmission source. Issues of background noise or about different transmission protocols are not described.

US 2004/0030530 and U.S. Pat. No. 9,337,889 describes "A detector for detecting the presence of Direct Sequence Spread Spectrum (DSSS) signals transmitted by a controller to control an operation of a drone aircraft . . . ". This patent does describe a method of utilizing autocorrelation techniques on a series of peaks detected. However this method only claims to work with DSSS signals. They do not discuss other spread spectrum protocols such as FHSS. Nor do they discuss how to distinguish DSSS signals from background noise.

However, none of these claims describe a method of distinguishing the drone control signal from the background noise for all protocols including, but not limited to, narrowband, DSSS, and FHSS. It should be noted that the US military uses types of FHSS protocol signals to transmit information so that enemy forces are not able to detect the signal masked by the background noise.

U.S. Pat. No. 9,584,252 describes a system of multiple antennas and radio receivers that is monitoring an area for cell phones. It includes a geolocation component to attempt to pinpoint the location of the cell phone when operating. It attempts to block communication to unauthorized cell phones and allow authorized cell phones.

SUMMARY OF THE PRESENT INVENTION

The present invention is a system and method for detecting and locating the transmission of Radio Frequency (RF) signals from within a predefined geographical area (DGA). The hardware consists of a memory controller means (CPU) connected to, at least, two signal receivers (SR). The SR's are positioned on opposite sides of the DGA. Each SR is equipped with a multi-directional antenna (MDA) which is capable of receiving signals in the frequency range of interest and is also capable of determining the approximate direction of the signal transmission source.

The SR's are able to communicate with the CPU either directly or wirelessly. The data communicated is a measurement, at each MDA, of the power levels of the received signal recorded at discrete frequencies within a range of interest, and the exact time the measurement was made (the time of arrival or TOA of the measurement). The system incorporates an initial training period before monitoring for hostile signals inside the DGA. The system is trained by recording only background noise (i.e. no hostile signals from the DGA). The power levels of the background noise at each frequency within the range of interest are viewed as random variables which are modeled with a known statistical distribution. Then a one tail confidence limit (i.e. 99%) is set on the power level distribution associated with each frequency.

During monitoring, a series of optional filters attempts to eliminate all signals that consist of only background noise during monitoring process. The filters screen out all signals except the strongest in each SR at a given frequency and time. They also eliminate signals with power levels less than the confidence limit. Any surviving signals with no pair on a different SR are eliminated. Finally, any signal with paired intersection points outside the DGA are eliminated. If there are any surviving intersection points, a cluster of those points may indicate a static RF transmitter location or a dynamic RF transmitter trajectory (i.e. a flying drone).

The surviving paired signals with intersection points inside the DGA, if any, will form a cluster of points where a suspected hostile signal transmitter is located. Appropriate action can then be taken regarding the suspected hostile signal transmitter.

It should be noted that the present invention will detect the existence of an RF signal transmitter in a DGA but it will not decode the signal. Detection of the existence of a hostile signal transmitter is sufficient for many applications, i.e. the airport problem and the prison problem.

Lexicon of Terms and Abbreviations

Signal Transmitter—A device capable of transmitting radio frequency signals
SR (Signal Receiver)—A device capable of receiving radio frequency transmitted signals
Direction Finding Antenna—An antenna that receives signals with greater power in specific directions
MDA—Multiple direction finding antennas (i.e. in one SR)
Memory Controller (CPU)—A device capable of communicating with other devices and making calculations, performing logic operations, storing and retrieving data
Memory—A device controlled by a memory controller capable of storing data, the device including, but not limited to hard drives, floppy drives, and flash drives.
Probability density distribution—A model of a probability distribution that approximates the properties of a random variable and whose area sums to 1.0
Display—A device for the CPU to communicate with a human such as a computer monitor
DGA—The defined geographical area to be monitored as a no signal transmission zone
TOA—The exact time of arrival of a signal to a SR. The time at which a measurement of the power level of a signal are made.
HT—A Hostile Transmitter (i.e. A radio frequency Signal Transmitter transmitting from within the DGA)
BN—Background Noise Transmissions (i.e. cell phones, etc transmitting distant signals from outside the DGA
Alarm—A device capable of alerting humans of a change in status including, but not limited to audio warnings, visual warnings, electrical warning signals.
Camera—A device capable of capturing and transmitting visual images
RF—Radio Frequency

DETAILED DESCRIPTION OF THE DRAWINGS

Figure 1:
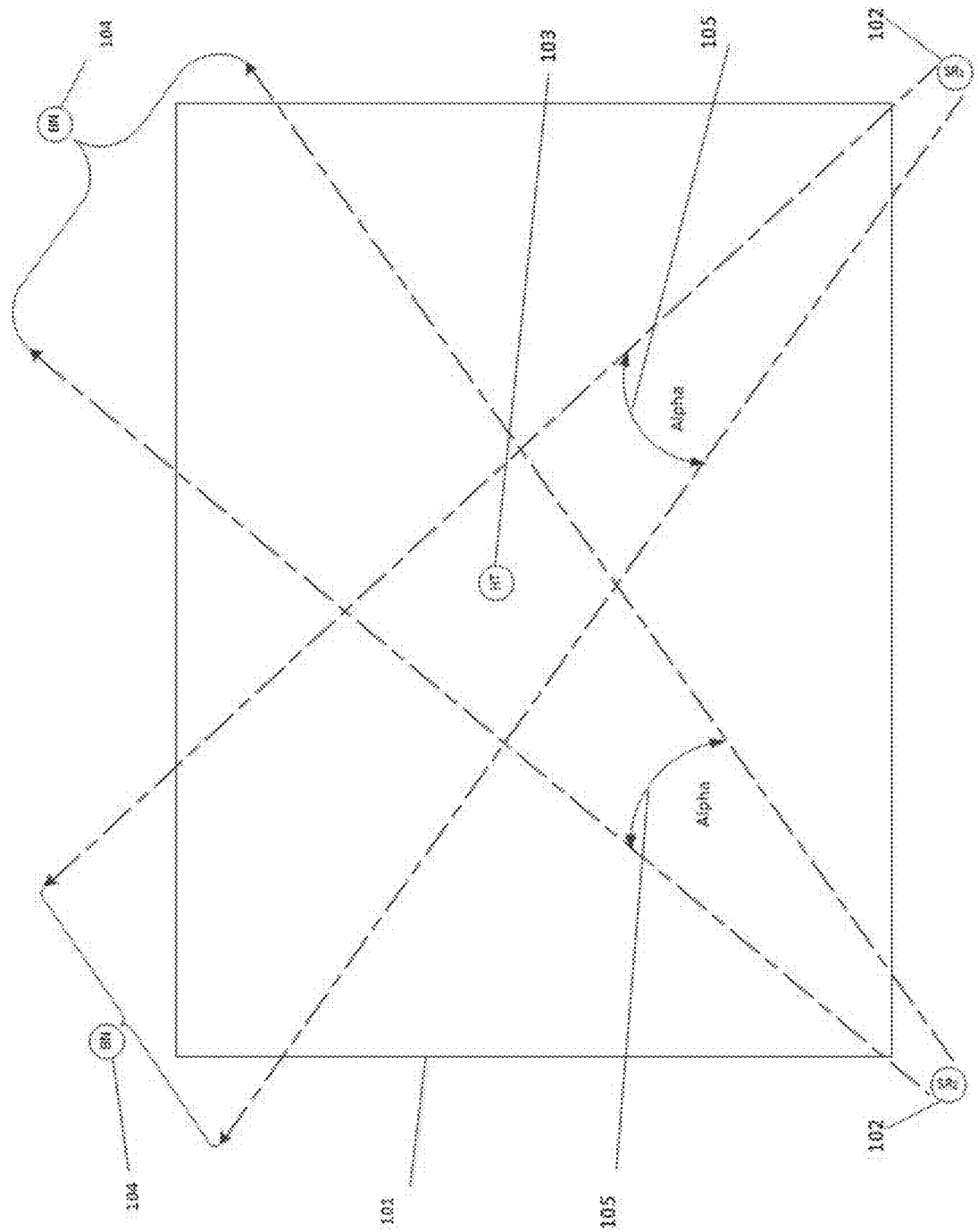
FIG. 1 is an overhead schematic view of the designated geographical area with the signal receivers triangulating on a hostile RF transmission.

FIG. 1 is an overhead schematic view of the DGA 101 being monitored. The signal receivers 102 are positioned a distance apart, preferably on each side of the DGA. The signal receivers (SR) will detect RF signal transmissions 104 originating from inside and outside the DGA. These transmissions are typically background noise. The SR's contains a plurality of direction finding antennas (MDS) each of which are constructed to receive signals in a relatively narrow range as shown by two dashed lines radiating from the SR's at an angle "alpha" 105. If a hostile signal transmitter 103 is broadcasting from within the DGA then at least one of the direction finding antennas, in at least two SR's should receive that signal in addition to the background noise.

Figure 2:
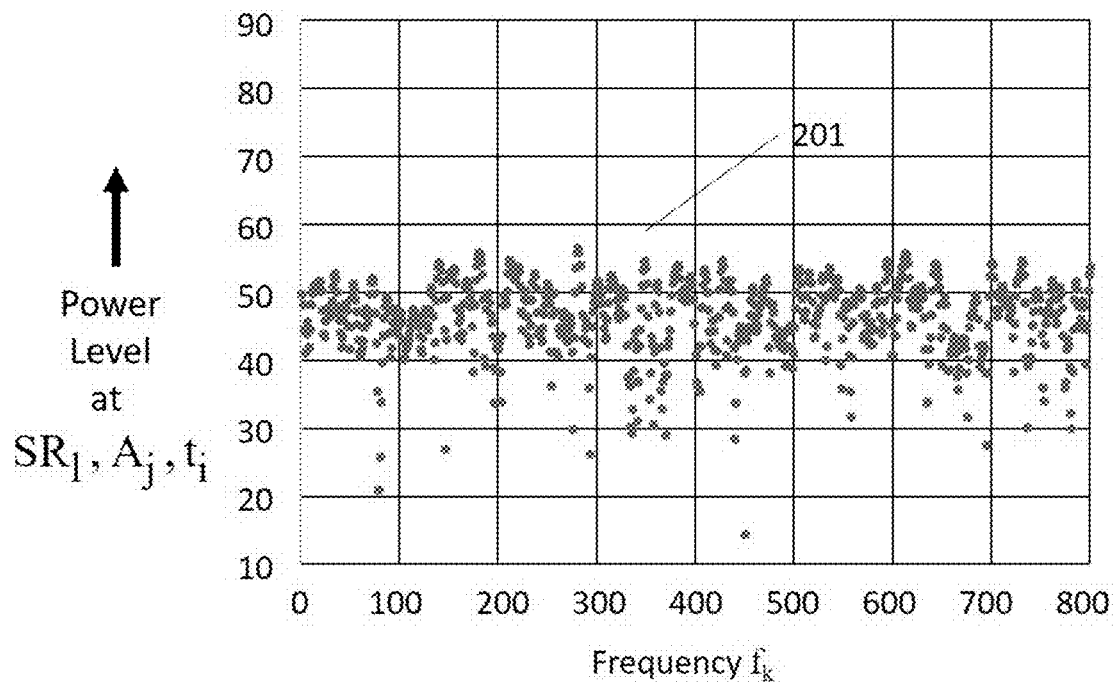
FIG. 2 is an image of a graph of typical background noise.

FIG. 2 is a graph of typical background noise 201. Typically, background noise is comprised of many different sources (thermal noise as well as cell phones, Wi-Fi, etc.). Each point in the graph in FIG. 2 represents a reading of the signal power level at a given frequency received by one direction finding antenna in one SR at one point in time in the DGA. As the DGA is monitored over time, many readings, such as the example in FIG. 2, are taken and recorded. The signal power level readings over time at each frequency on each direction finding antenna form a population of data points. During the training period, that population is then modeled as a statistical distribution and a confidence limit is determined from a pre-determined percentage (i.e. 99%). During the monitoring period, most of the data points are filtered out according to the description of the filtering process. From the signal power levels recorded at each TOA, at each frequency, and at each direction finding antenna, along with knowledge of the locations and positioning of the direction finding antennas associated with the surviving data points, triangulation is used to calculate the position of any suspected hostile transmitters transmitting from within the DGA.

Figure 3:
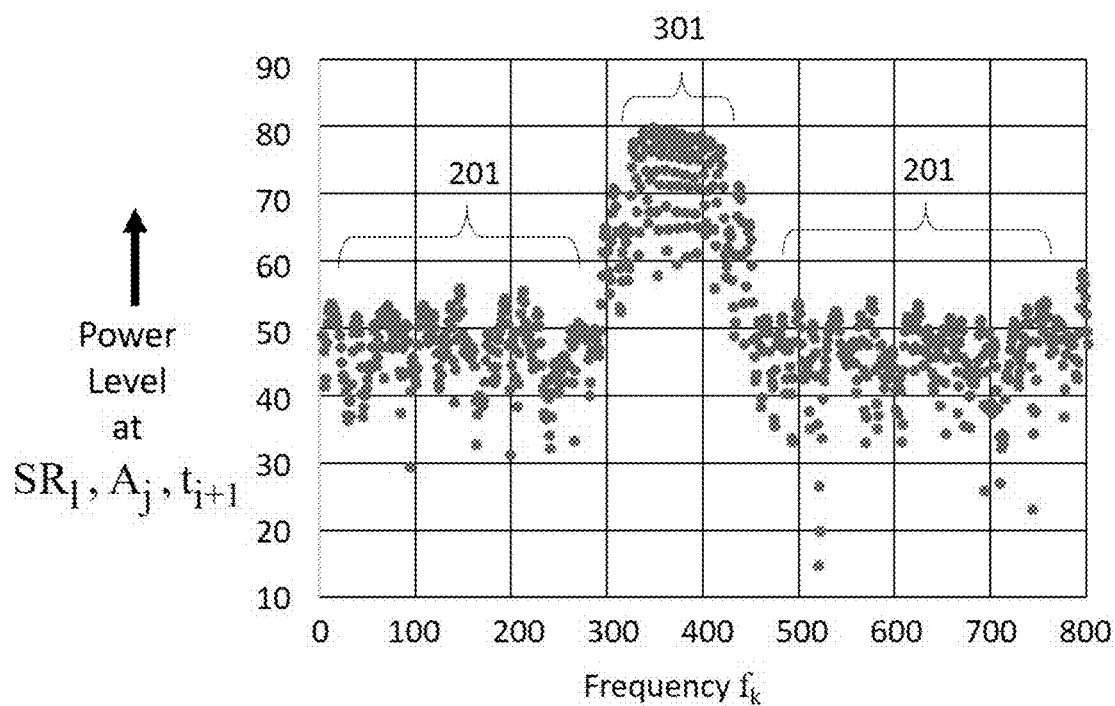
FIG. 3 is an image of a graph of typical background noise showing an occurrence of a hostile signal between 300-400 MHz.

FIG. 3 is also graph of typical background noise 201, however it is shown at a point in time that where there is an occurrence of a hostile signal 301. When a hostile signal transmission occurs from within the DGA, it's power will add to the total background power levels at each frequency. The addition of a hostile signal on top of the background noise produces an increase 301 of the random variable power levels for the frequencies on which the hostile transmitter is transmitting. Spread spectrum transmission protocols may produce multiple bumps (301) at different frequencies.

Figure 4A:
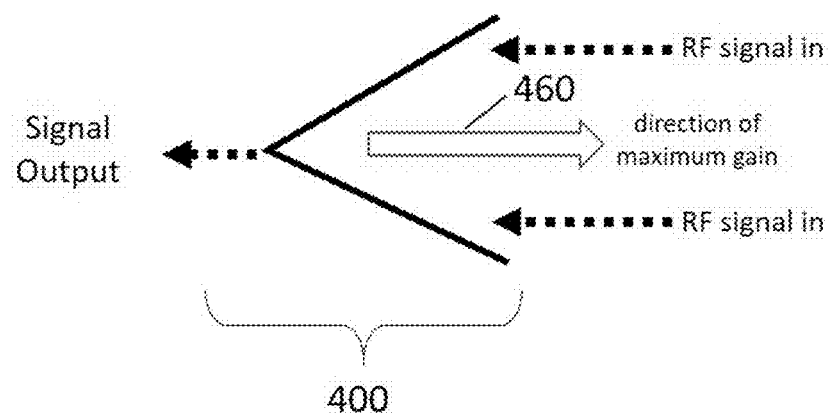
FIG. 4A is a schematic drawing of a direction finding antenna in a signal receiver.

FIG. 4A shows a schematic drawing of one of the direction finding antennas 400 in a SR. The direction of the maximum signal power reception is shown by the arrowed line.

Figure 4B:
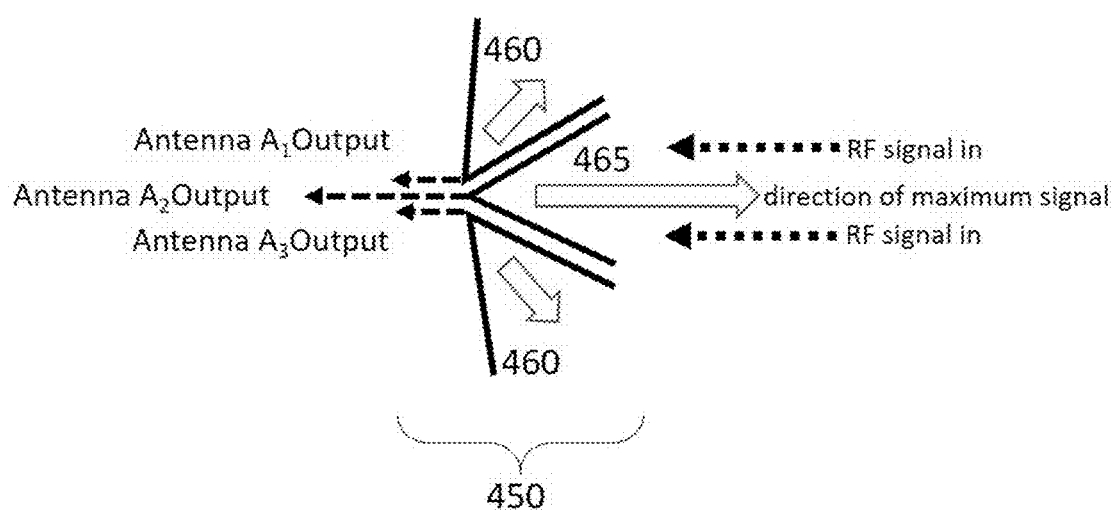
FIG. 4B is a schematic drawing of three direction finding antennas in a signal receiver

FIG. 4B is a schematic diagram of a MDA 450 with three (as an example) direction finding antennas 460 and the centerline direction 465 of the directional antenna with the maximum power.

Figure 5:
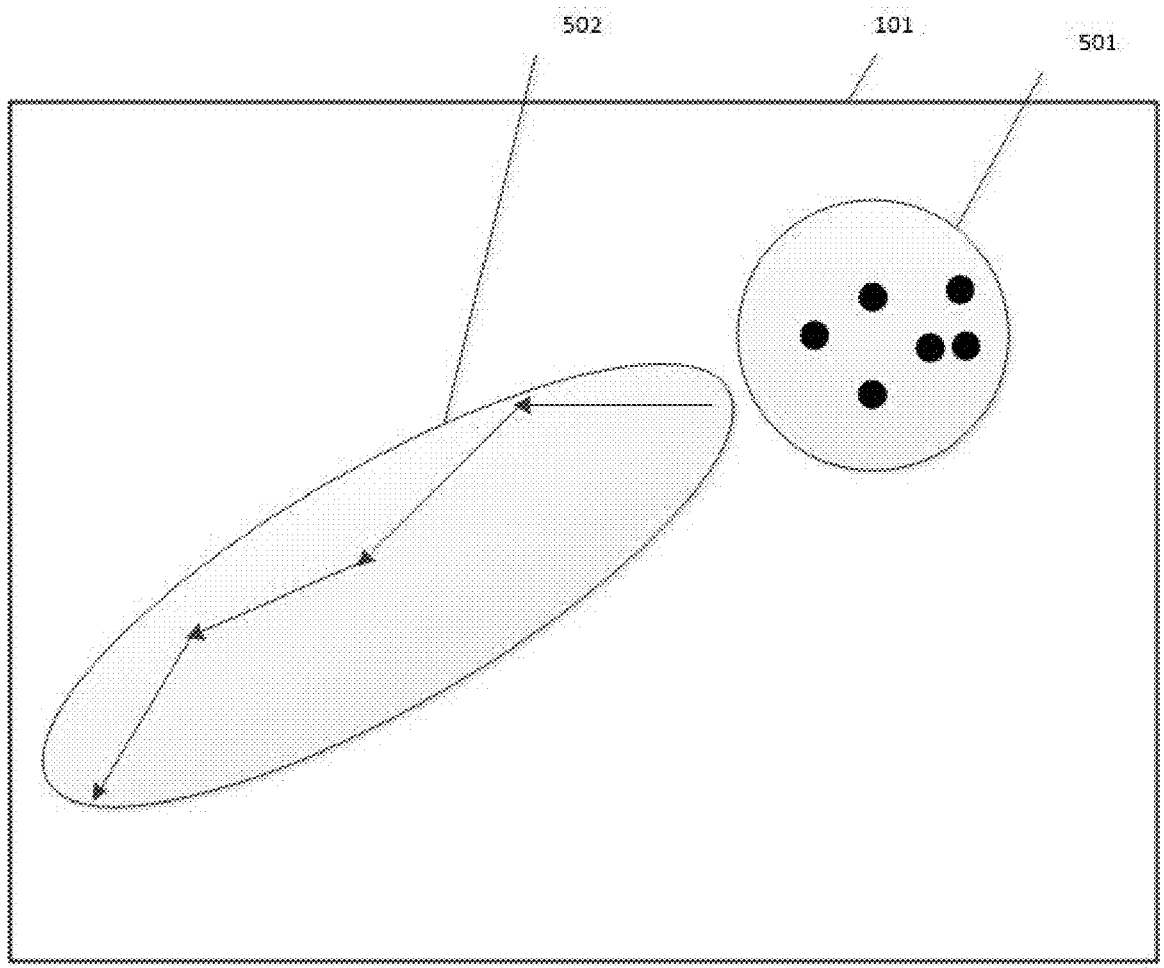
FIG. 5 is a schematic of the designated geographical area with a static cluster of suspected hostile transmitter locations and a dynamic cluster of suspected hostile transmitter locations.

FIG. 5 is a schematic of the DGA 101 with a static cluster 501 of suspected hostile transmitter locations and a dynamic cluster 502 of suspected hostile transmitter locations shown as patterns of dot locations. Each dot corresponds to a suspected hostile transmitter location calculated over a successive time interval. A tight cluster of dots may indicate the location, within the DGA, of a static hostile transmitter (e.g. from a drone control transmitter). A trajectory of points 502 may indicate a dynamic hostile transmitter (e.g. from a flying drone).

Figure 6:
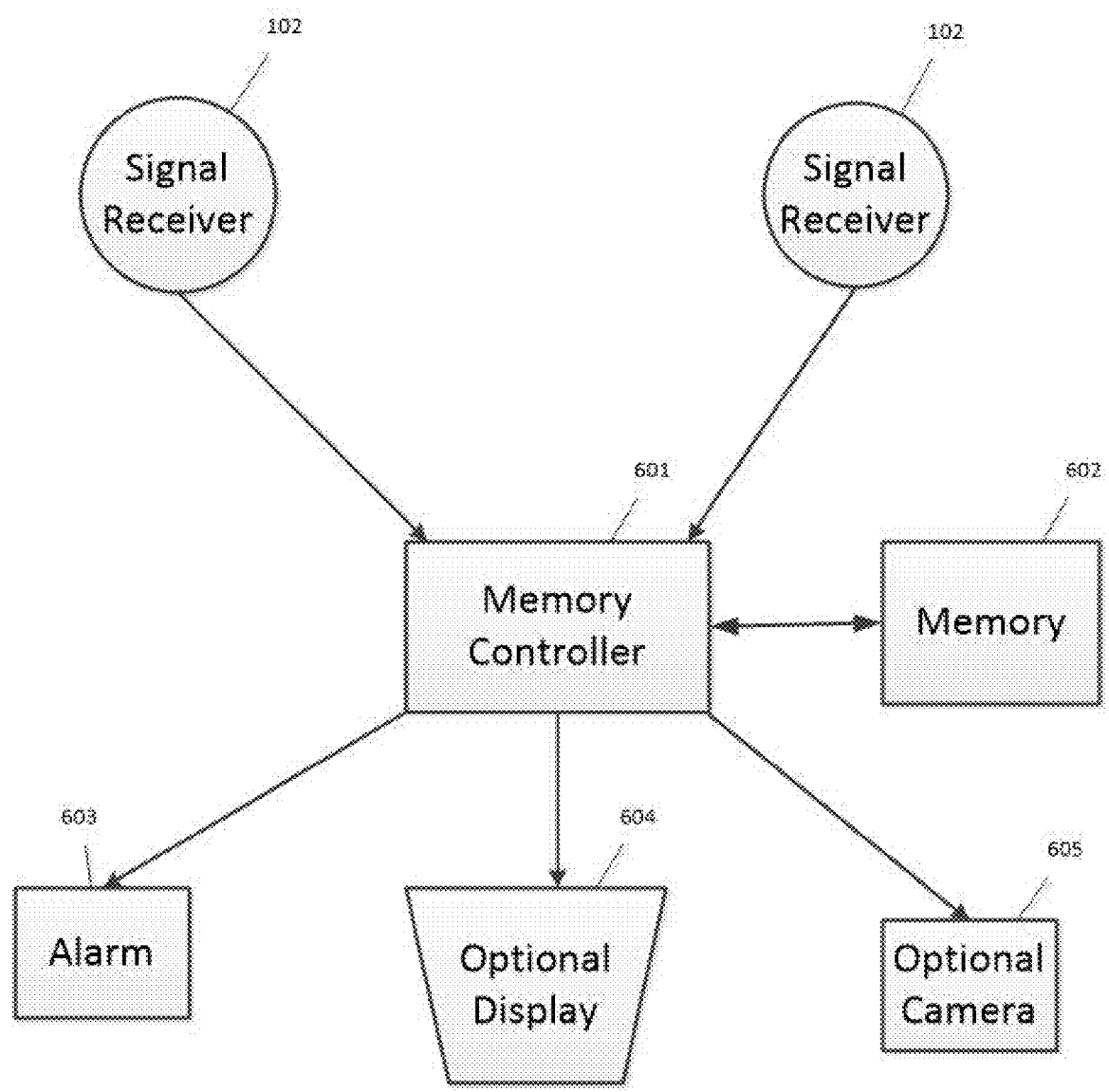
FIG. 6 is a schematic diagram of the components of the present invention and their connections.

FIG. 6 is a schematic diagram of the components of the present invention and their connections. All components are connected to the memory controller (CPU) 601 either wired or wirelessly. The SR's 102 sends signals to the CPU. The memory 602 stores data for the memory controller and retrieves it when needed. The alarm 603 is required to notify the appropriate person or persons if a hostile transmitter is detected. The optional display 604 may be used to view clusters of points of possible hostile transmitter locations. An optional camera(s) (605) is used to produce the display.

Figure 7:
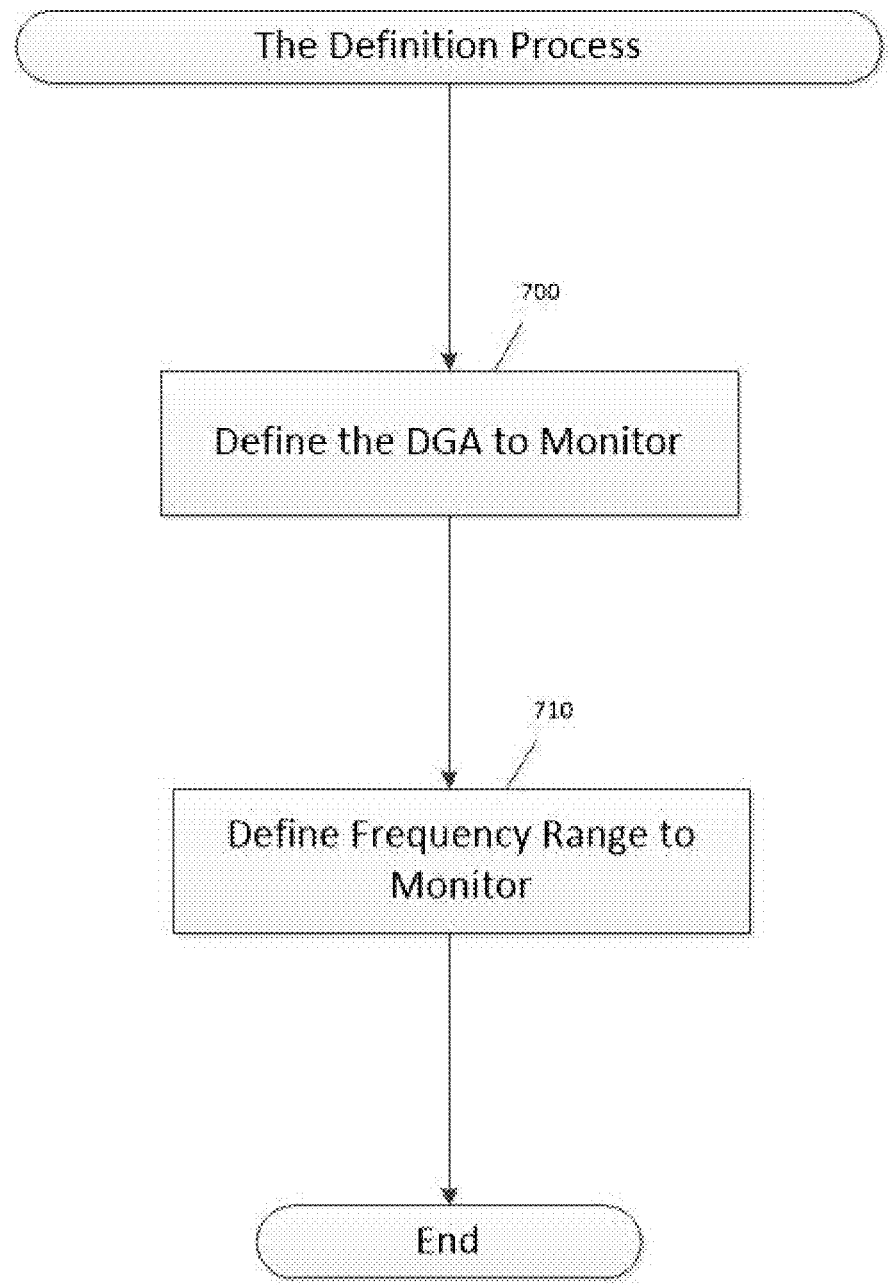
FIG. 7 is a flow chart of the definition process of the present invention.

FIG. 7 is a flow chart of the definition process. The first step is to define the DGA 700 to be monitored. The second step 710 is to define the expected operating frequency range of hostile transmitters.

Figure 8:
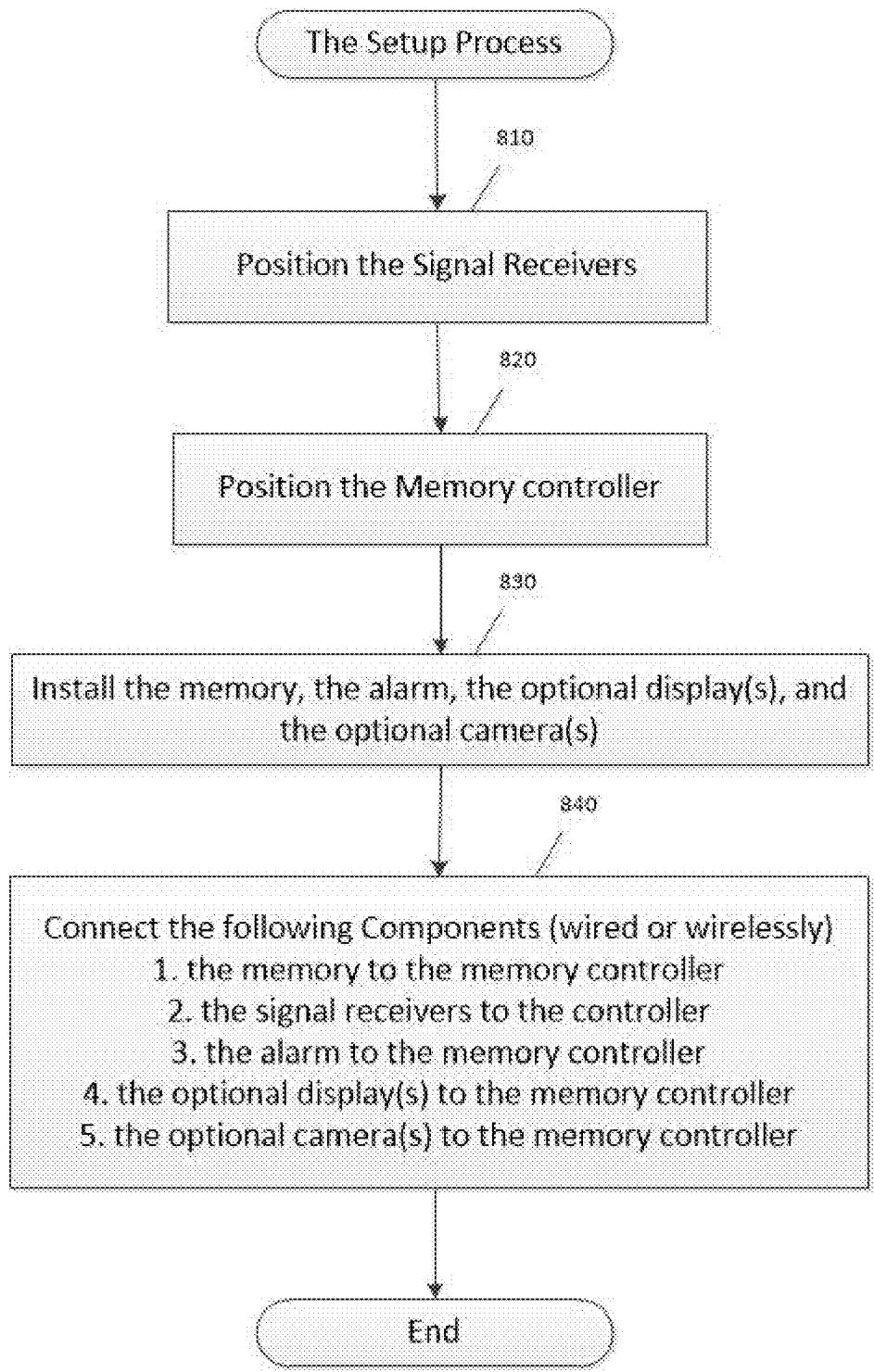
FIG. 8 is a flow chart of the set-up process of the present invention.

FIG. 8 is a flow chart of the set-up process. The SR's are positioned 810 or mounted near the perimeter of the defined DGA such that the direction finding antennas receive signals transmitted from the entire DGA. An indoor location is typically selected to house the CPU 820. Then the memory 830 and the optional display 830 are installed, typically in close proximity to the CPU. The alarm 830 and the optional camera 830 are conveniently located for the person or persons responsible for taking action if a hostile transmitter is located. Finally all components are connected to the CPU 840.

Figure 9A:
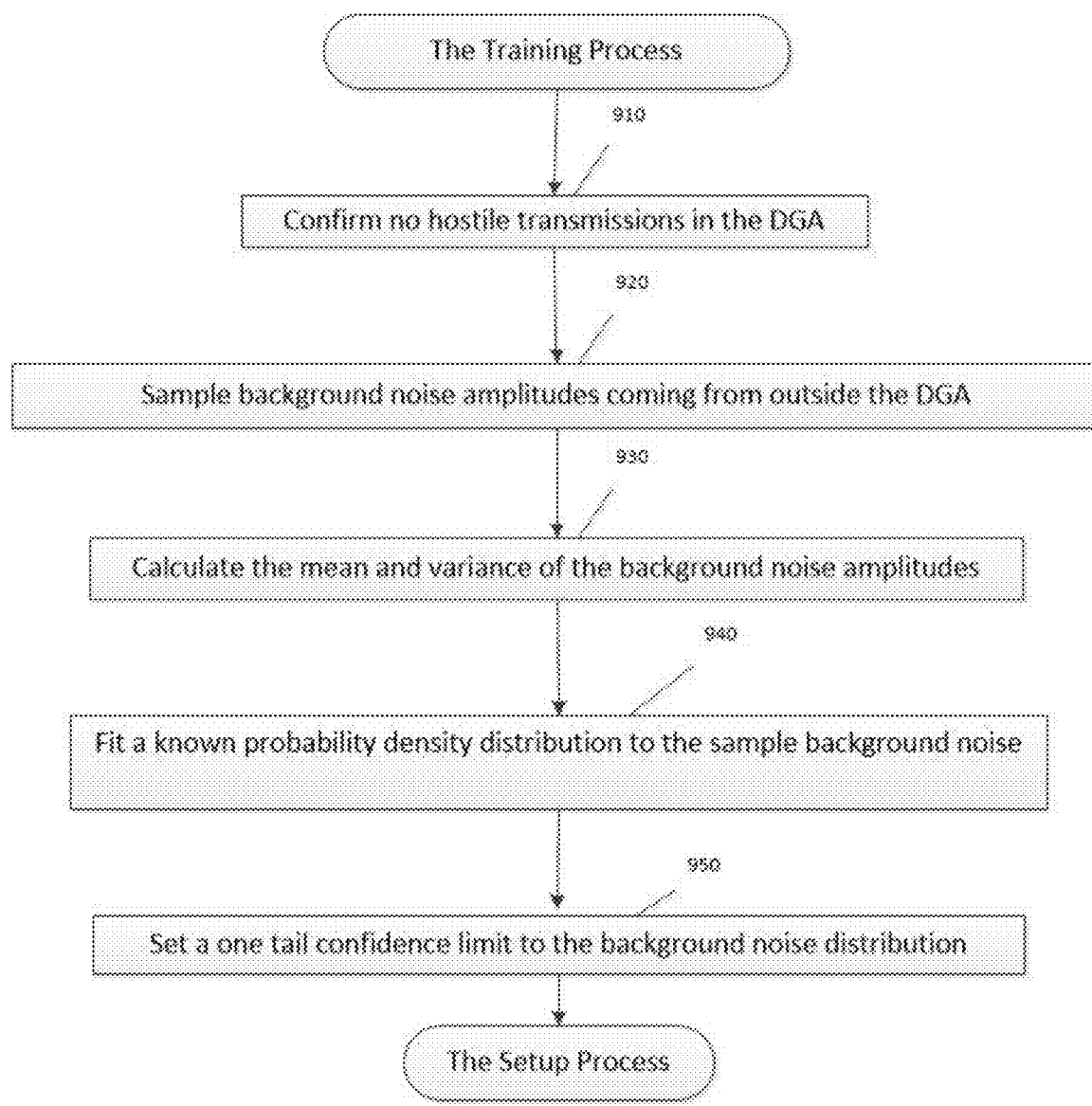
FIG. 9A is a flow chart of the training process of the present invention.

FIG. 9A is a flow chart of the training process. The purpose of the training process is to estimate the statistics of the power level distribution of the background noise for each frequency within the specified frequency range. This is accomplished by first confirming that no hostile transmitters are present in the DGA 910. Then the background noise power level at each frequency, at each of the direction finding antennas, at each of the signal receivers is sampled over a pre-defined time period 920. Statistics, such as the mean and variance, are calculated on the samples 930. A known probability distribution is fit to the sample data at each frequency, at each of the direction finding antennas for each signal receiver 940. Finally, a one tail confidence limit is set (e.g. 99%) 950 on the received signal power levels at each frequency in the desired frequency range for each of the direction finding antennas for each signal receiver. The training process may be redone as frequently as deemed necessary.

Figure 9B:
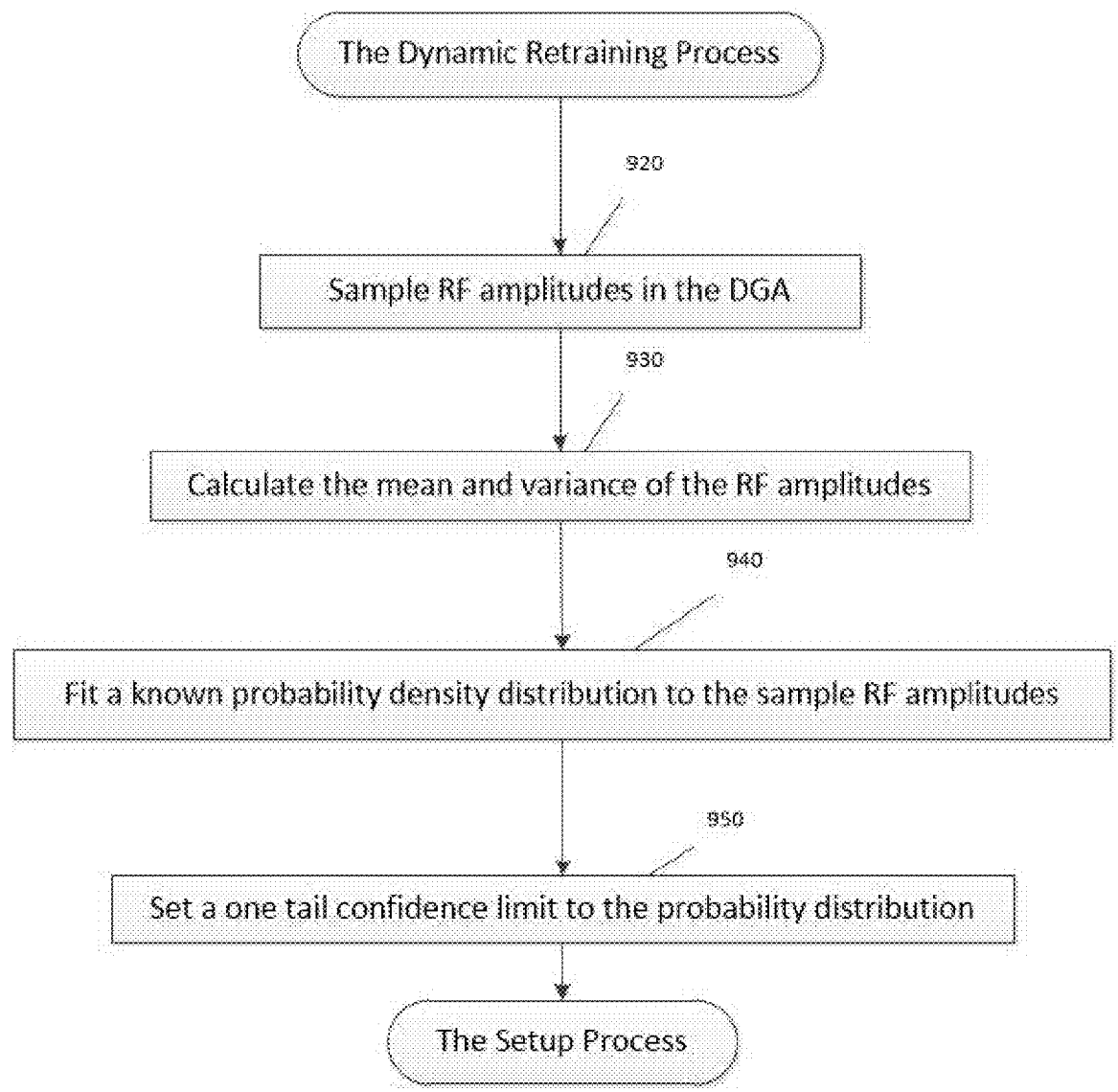
FIG. 9B is a flow chart of the dynamic retraining process of the present invention.

FIG. 9B is a flow chart of the dynamic retraining process. The difference between the process in this figure and that in FIG. 9A is that a hostile transmission may be present in the measurement samples. Retraining, with assurance that no hostile transmissions are present, may be impractical or economically infeasible. Training is time and labor consuming since one must verify that no hostile transmissions are occurring from within the DGA. Fortunately, the statistics of the random variables at each frequency are only affected slightly if the sample contains a briefly occurring hostile transmission, and that hostile transmission will still be detected by the present invention providing the dynamic retraining time interval is sufficiently long. Therefore, as a practical matter, the dynamic retraining process may be automatically run periodically without the need for manual intervention.

Figure 10:
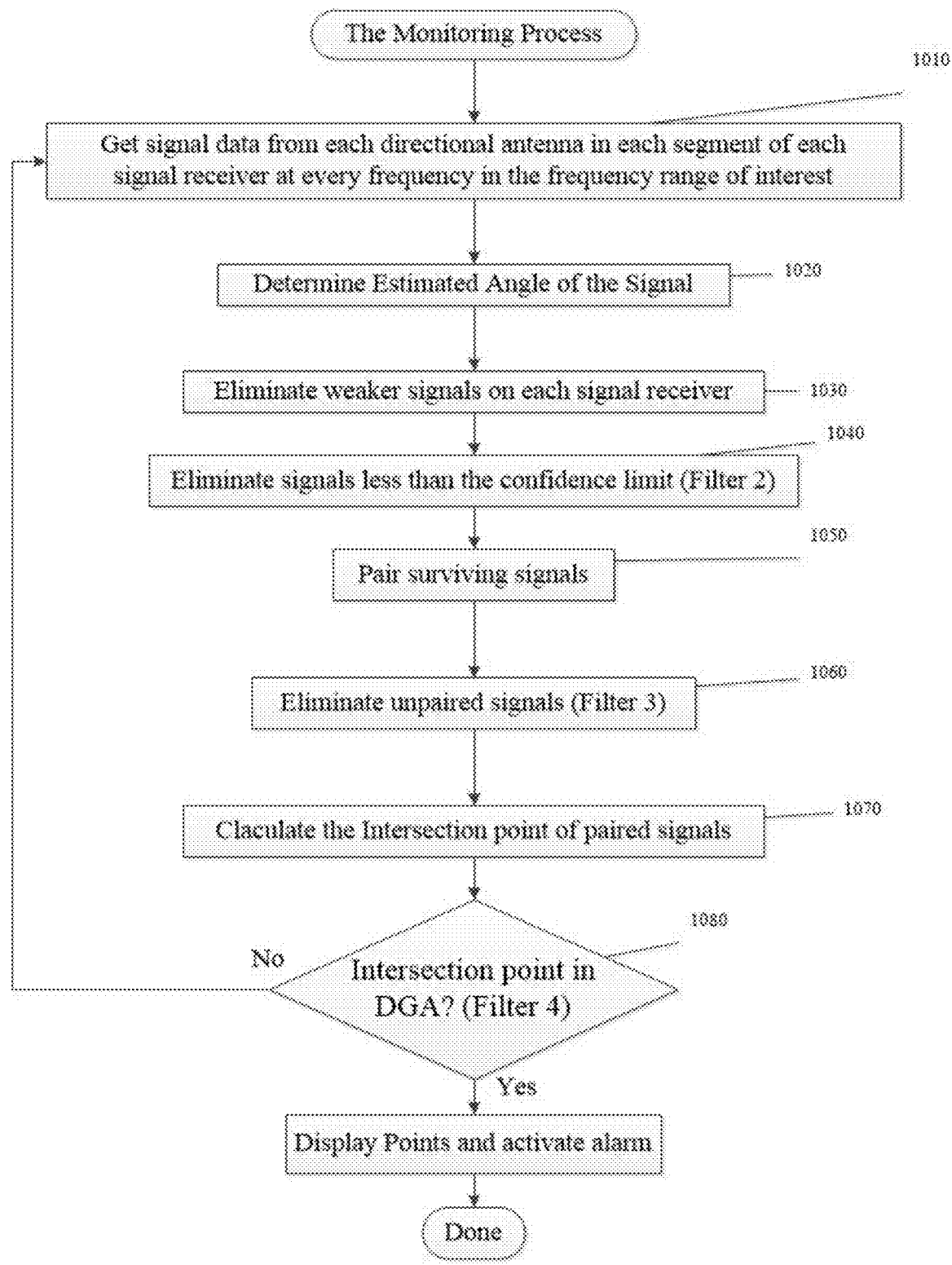
FIG. 10 is a flow chart of the monitoring process of the present invention

FIG. 10 is a flow chart of the monitoring process. During monitoring, the first action is to capture signal data 1010 from all the directional antennas within all signal receivers in the desired frequency range. The estimated angle of the signal transmission (relative to the signal receiver) can be calculated 1020 from the power levels and the centerlines of each directional antenna within the signal receiver. There are at least two methods to calculate the estimated angle of the signal transmission. One way is to simply select the centerline of the directional antenna with the maximum power. A second way is to calculate the power level weighted average of the centerline angles of the directional antennas in the signal receiver. Filter 1 is then applied to eliminate all signal data from the directional antennas except for the one with the maximum power level 1030. Additional signal data can be eliminated by retaining only the signals that exceed the confidence limit for sample population of the corresponding classification of signals 1040. The next step is to attempt to pair the remaining signals on different signal receivers 1050. A pairing requires that two signals on different signal receivers be at the same frequency and TOA. All signal data with no pairing is then eliminated (filter 3) 1060. The next step is to project a line from each paired signal in the direction of the estimated angle of the signal transmission. Then, using triangulation, calculate the intersection point of both lines 1070 is calculated. Finally if the intersection point is not in the designated geographical area then that signal data can be eliminated (Filter 4) 1080. Any remaining intersection points represent the locations of suspected hostile radio frequency transmissions. This must be validated by activating the alarm(s) and the camera(s).

If there are no remaining intersection points (the majority of the time) then monitoring continues until re-training is scheduled.

Figure 11:
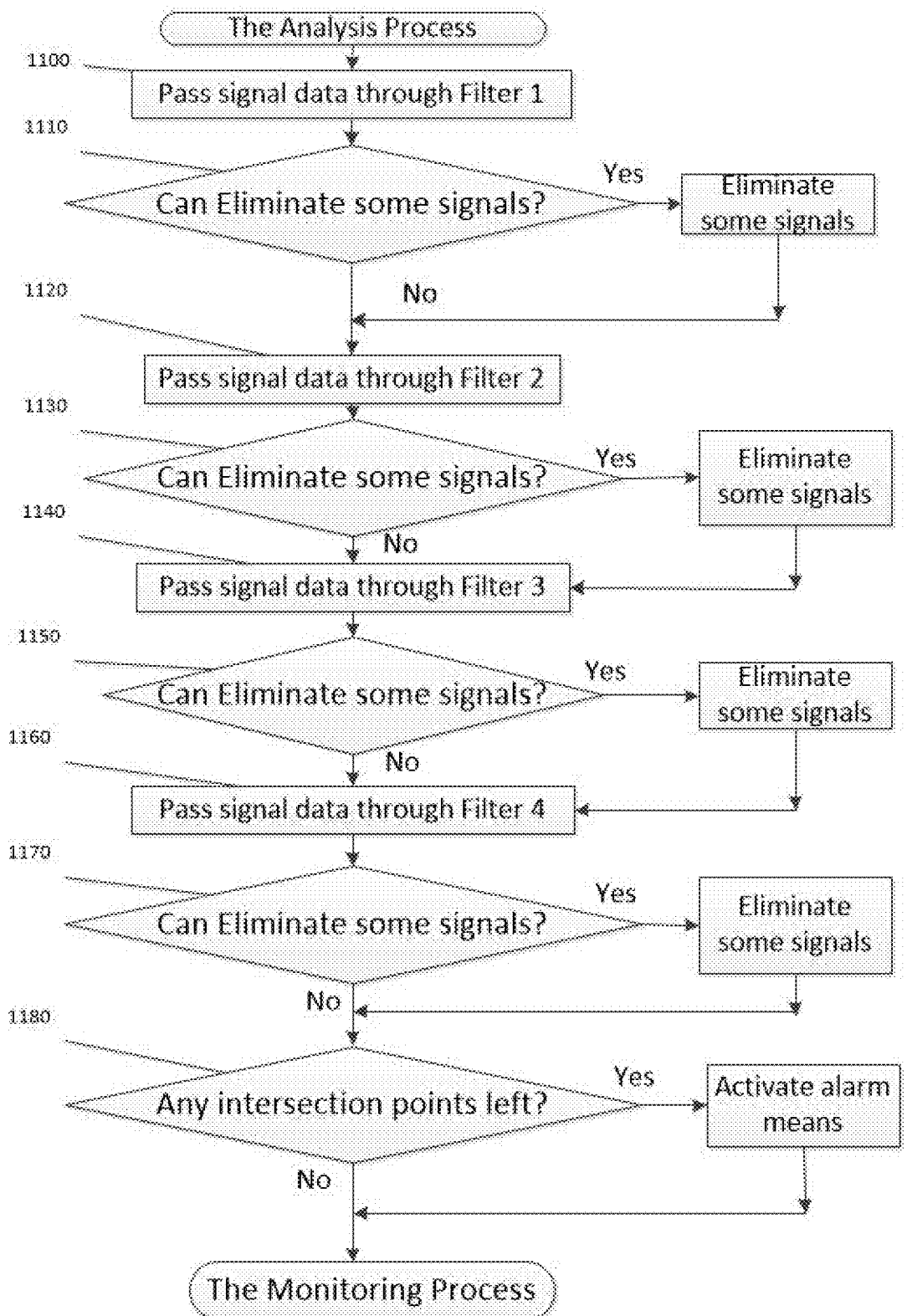
FIG. 11 is a flow chart of the analysis process of the present invention.

FIG. 11 is a flow chart of the analysis process. The analysis process filters out as many signals as possible to leave only the statistically significant ones that may indicate the existence and location of a signal transmitter.

The received signals are first passed 1100 through Filter 1 which eliminates 1110 all signal data from the directional antennas except for the one with the maximum power level.

The surviving signals from Filter 1 are then passed 1120 through Filter 2 which eliminates 1130 signals less that the confidence limit that has been pre-defined by the user.

The surviving signals from Filter 2 are then paired 1140 on arrival time and frequency in Filter 3. Any unpaired signals are then eliminated 1150.

The surviving signals from Filter 3 are linearly extrapolated between the directional receiver and the angle of arrival to triangulate to the intersection point of the two lines. The intersection points are passed 1160 through Filter 4. Any intersection points outside the designated geographical area are eliminated 1170.

If there are any surviving intersection points 1180 then an alarm is activated to warn of the existence and location of a suspected signal transmitter in the designated geographical area.

Figure 12:
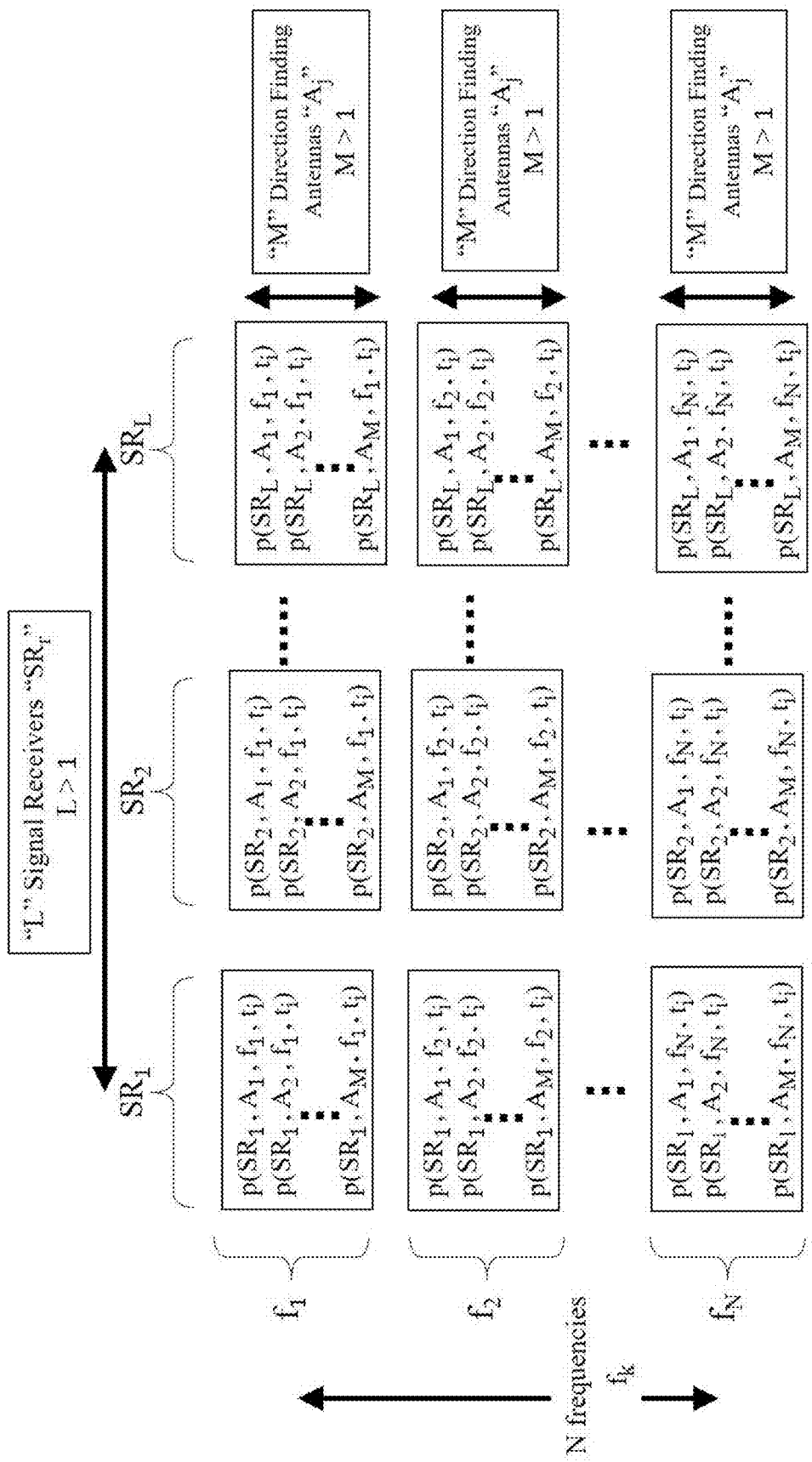
FIG. 12 shows the detail of the signal power data points that is collected at each time interval for each frequency and for each signal receiver.

FIG. 12 shows the detail of the signal power data points that is collected at each time interval $t_i$ where:
$P(SR_r, A_j, f_k, t_i)$=the power level collected by the $r^{th}$ SR on its $j^{th}$ direction finding antenna at the $k^{th}$ frequency collected at the TOA.
$SR_r$=Signal Receiver r for r=1 to L
$A_j$=direction finding antenna "j" for j=1 to M {M=the number of direction finding antennas in each SR}
$f_k$=the $k^{th}$ frequency collected for k=1 to N {N=the number of frequencies collected}
$t_i$=the time of arrival where i=1 to I {I=the number of times data was collected in the predetermined range of frequencies}

Figure 13:
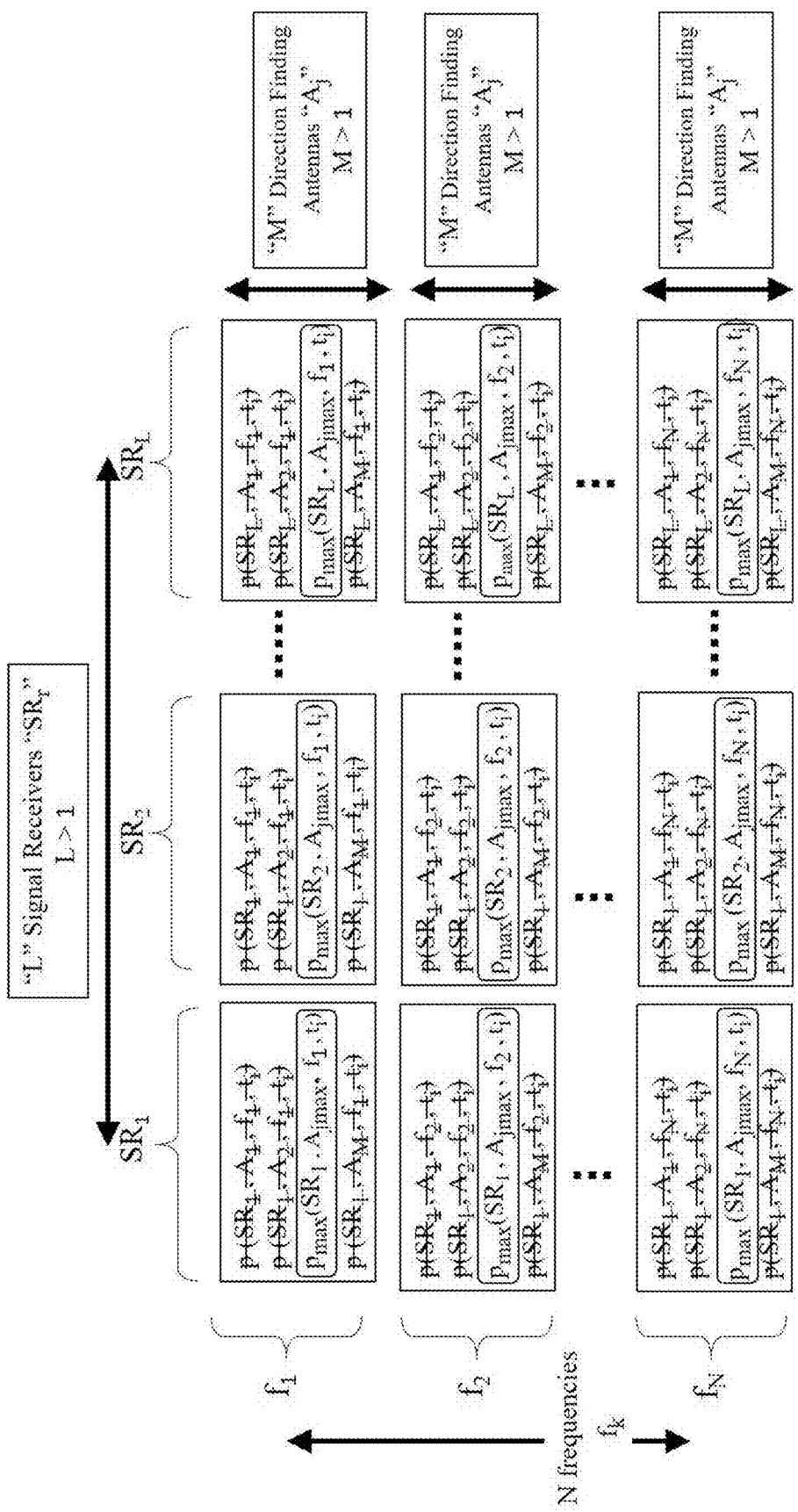
FIG. 13 shows the elimination of signal power data points with Filter 1.

FIG. 13 shows the elimination of signal power data points with Filter 1.

Figure 14:
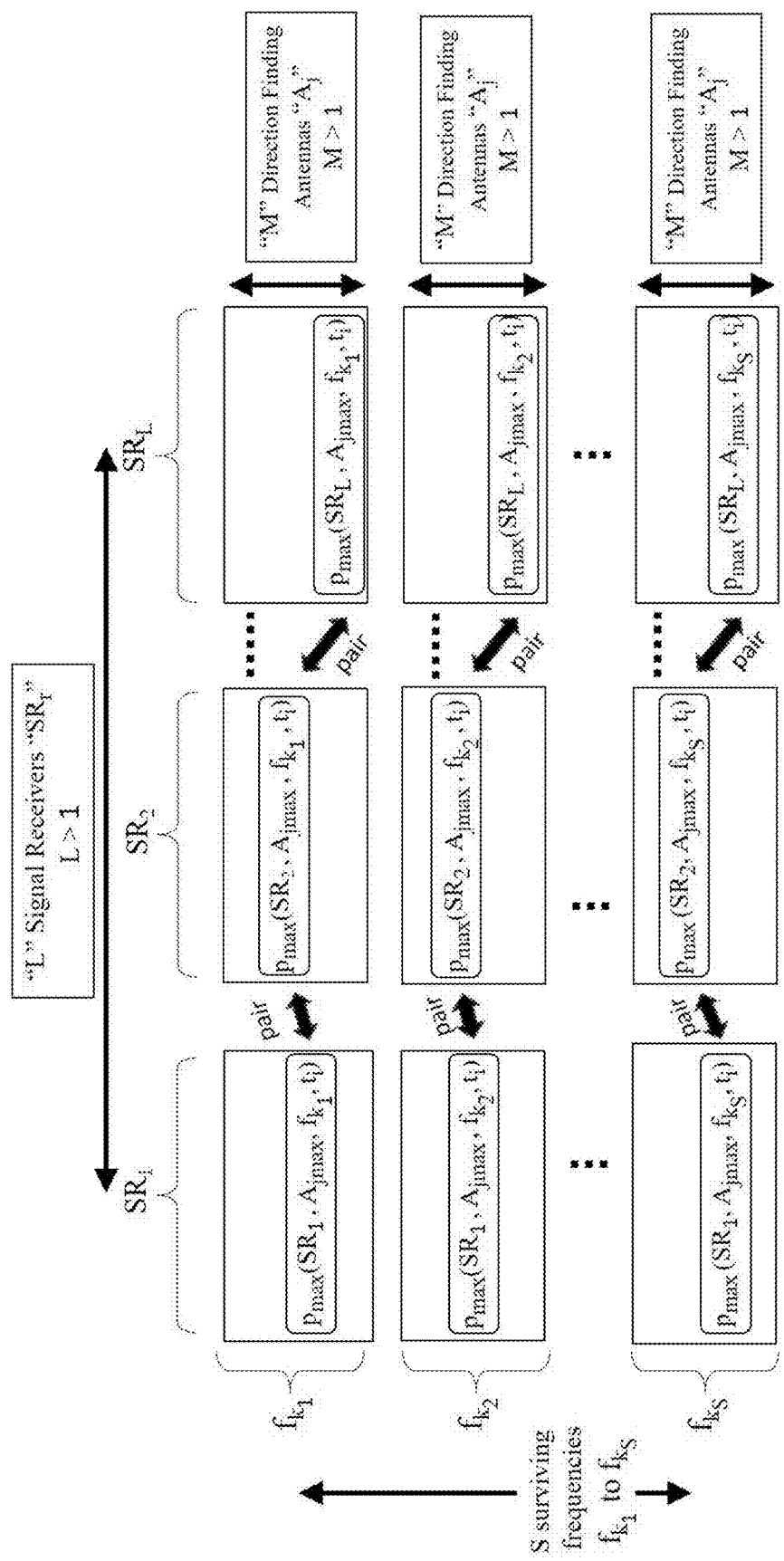
FIG. 14 shows the elimination of signal power data points with Filters 2 and 3.

FIG. 14 shows the elimination of signal power data points with Filters 2 and 3.

Figure 15:
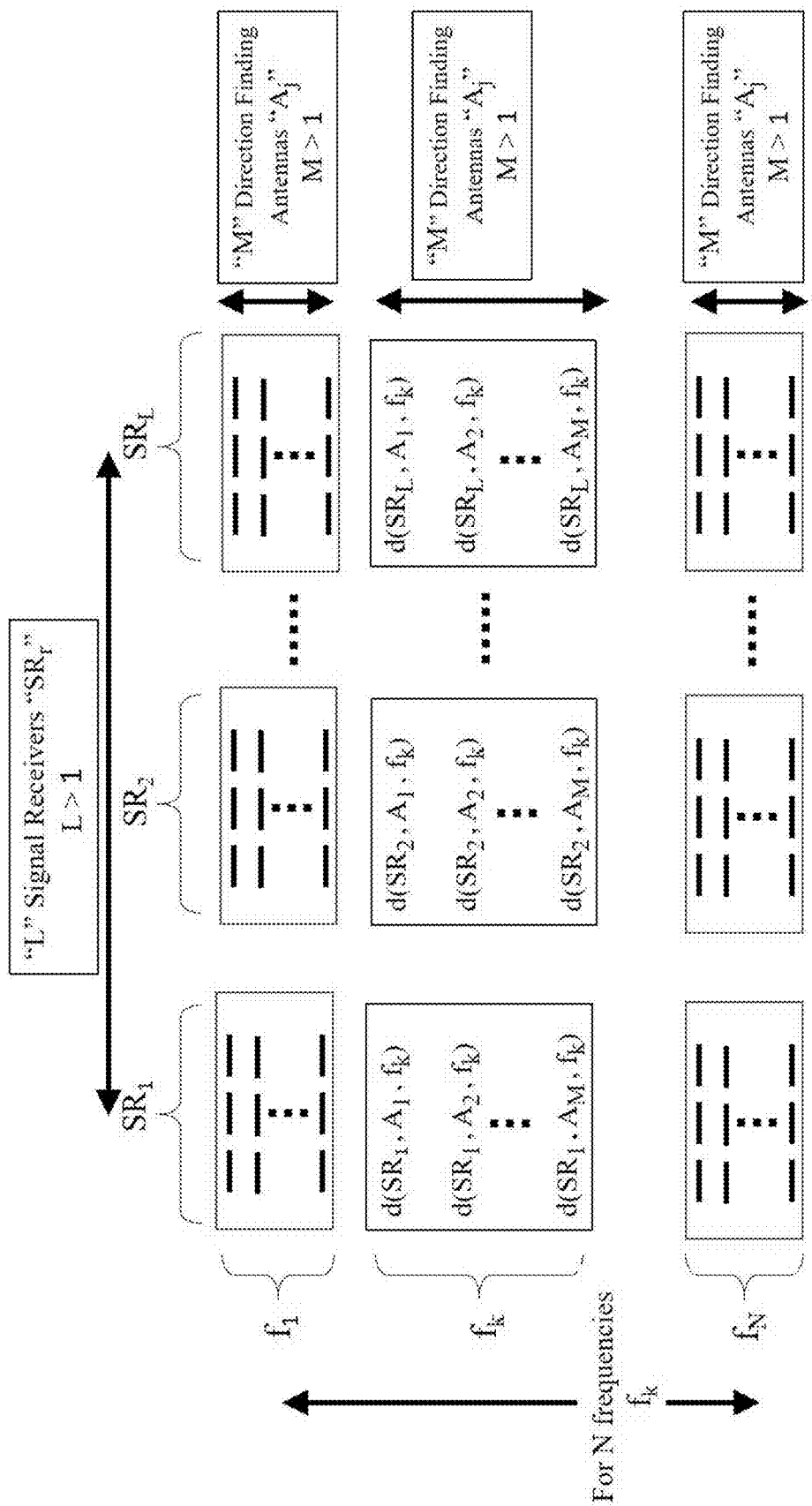
FIG. 15 shows the distribution of signal power data points for calculating the mean and standard deviation of the populations of data points collected for each frequency, for each signal receiver and for each direction finding antenna.

FIG. 15 shows the distribution of signal power data points for calculating the mean and standard deviation of the populations of data points collected for each frequency, for each SR and for each direction finding antenna.

Figure 16:
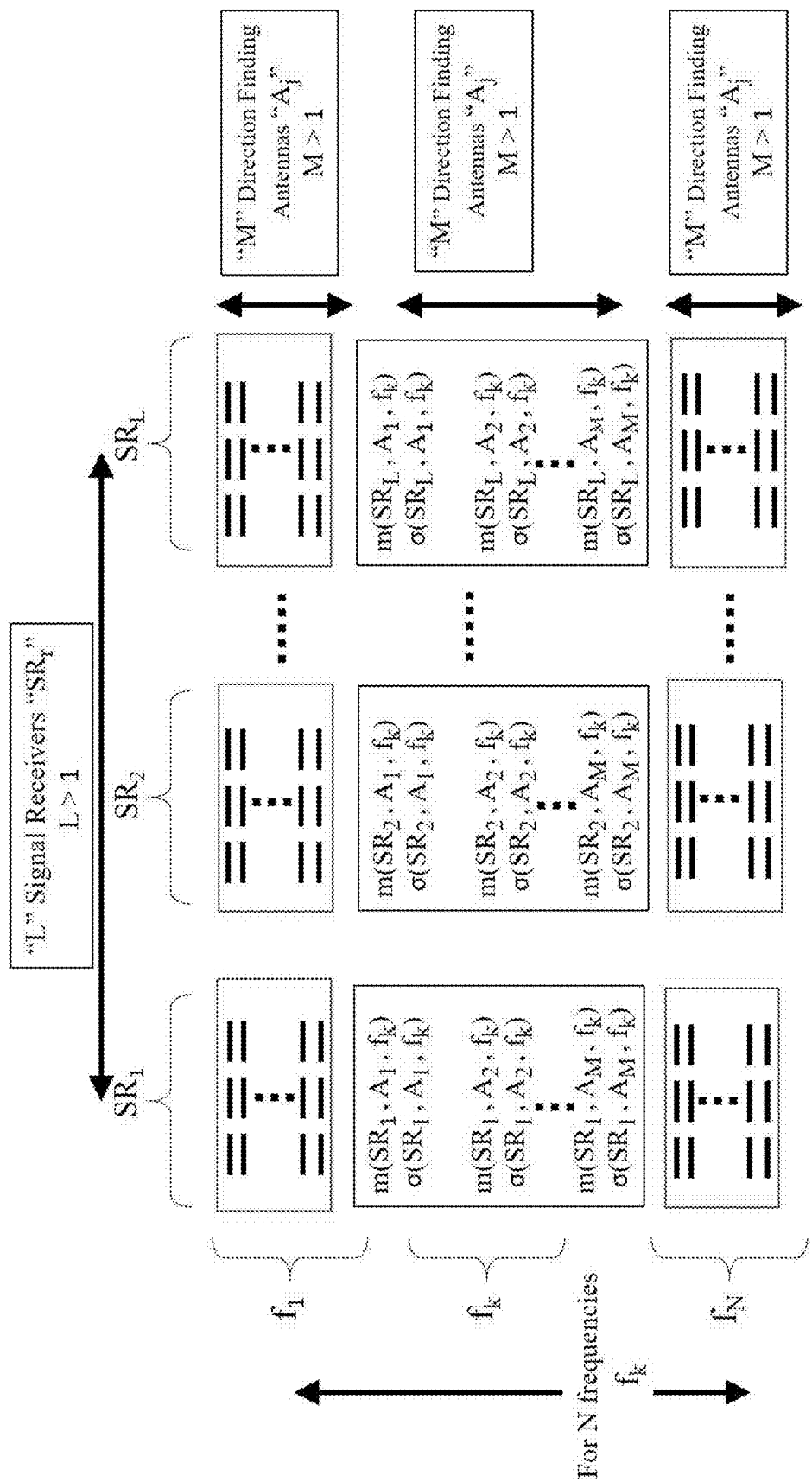
FIG. 16 shows the process of calculating the mean and standard deviation of the populations of signal power data points collected for each frequency, at each signal receiver and for each direction finding antenna.

FIG. 16 shows the process of calculating the mean and standard deviation of the populations of signal power data points collected for each frequency, at each SR and each direction finding antenna.

Figure 17:
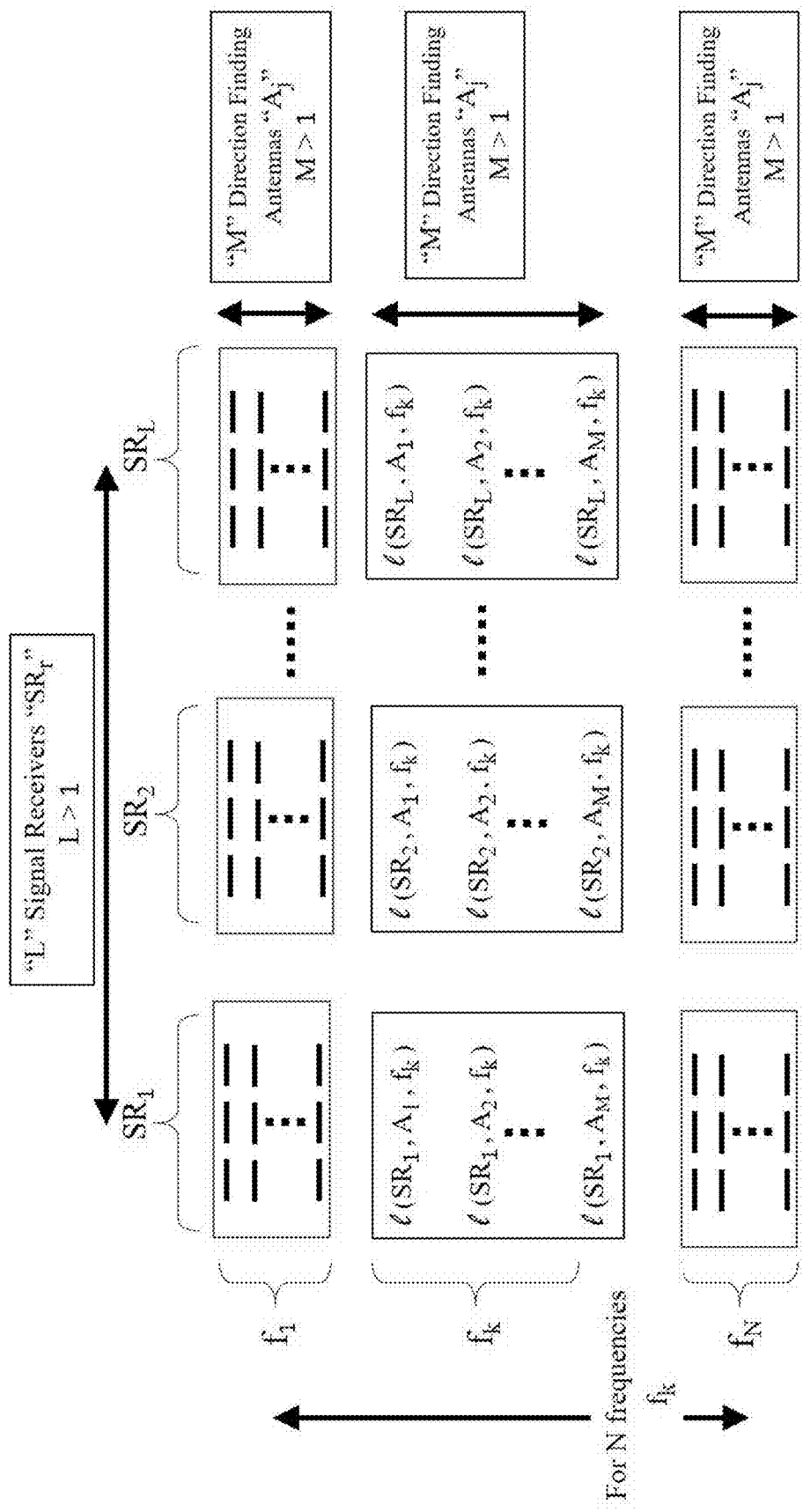
FIG. 17 shows the distributions needed to calculate the one-tail confidence limits for each frequency, each direction finding antenna, and at each signal receiver.

FIG. 17 shows the distributions needed to calculate the one-tail confidence limits for each frequency, each direction finding antenna, and at each SR.

Figure 18:
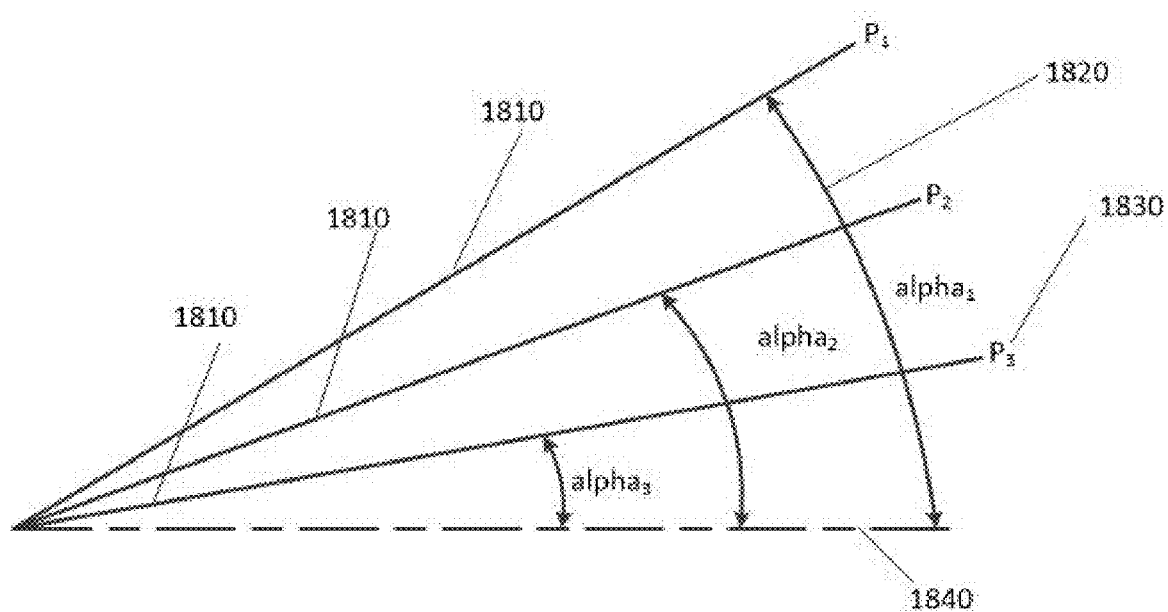
FIG. 18 is a drawing of the method to calculate the expected angle of the signal transmission from the readings of an example of three directional antennas in one signal receiver.

FIG. 18 is a drawing of the angles of an example of three directional antennas in one signal receiver. The centerline of the three directional antennas 1810 are at the angles alpha$_1$, alpha$_2$ and alpha$_3$ 1820 respectively. The example of the power level of one radio frequency signal on each antenna is P$_1$, P$_2$ and P$_3$ 1830 respectively. The angle is relative to a frame of reference 1840 passing through the signal receiver. This information is used to calculate the corrected assumed angle of the direction of the radio frequency transmission with respect to the signal receiver housing the directional antennas.

REFERENCE NUMERALS

101 The predefined geographical area (DGA)
102 RF Signal Receiver (SR)
103 A hostile RF transmitter within the DGA
104 Sources of background noise
105 A segment showing the range, alpha, of a direction finding antenna in the segment from a signal receiver
201 Graph of the amplitude (or power) of an example of background noise over time
301 Graph of the amplitude (or power) of an example of background noise with a bump from a hostile transmitter operating from within the DGA
400 Schematic of a direction finding antenna
450—a MDA
460—direction finding antennas
465—centerline direction of a direction finding antenna
501 A cluster of intersection points indicating the possible location of a static hostile signal transmitter
502 A sequence of intersection points indicating a possible trajectory of a dynamic hostile signal transmitter
601 Memory controller (CPU)
602 Memory
603 Alarm
604 Optional Display
605 Optional Camera(s)
700 Define the DGA
710 Define the frequency range to monitor
810 Locate, position and install the signal receivers (SR)
820 Locate, position and install the CPU
830 Install the memory, the alarm, the optional display, and the optional camera(s)
840 Connect the signal receivers, the memory, the alarm, the optional display, and the optional camera(s) to the CPU
910 Confirm that no hostile signal transmitters are operating inside the DGA during the training process
920 Sample the background noise
930 Calculate statistics, such as mean and variance, of the background noise amplitudes
940 Fit a known density probability distribution to the sampled background noise amplitudes
950 Set a one tail confidence limit on the fitted probability density distribution (i.e. 99%)
1010 Capture signal data
1020 Determine the estimated angle of the transmitted signal
1030 Eliminate weaker signals on each signal receiver (Filter 1)
1040 Eliminate signals less that the confidence limit (Filter 2)
1050 Pair surviving signals
1060 Eliminate unpaired signals (Filter 3)
1070 Calculate the intersection point of paired signals
1080 it the intersection point is inside the designated geographical area then display the point(s) and activate the alarm(s) otherwise eliminate the signal data (Filter 4)
1810—centerline of a directional antenna
1820—angle of centerline from a frame of reference
1830—the power level on a directional antenna
1840—a frame of reference

DETAILED DESCRIPTION OF THE PRESENT INVENTION

The present invention includes positioning at least two RF signal receivers (SR) 102 each equipped with a multi-directional RF antenna (MDA). A defined geographical area (called the DGA) 101 is designated such as near the airport runways or around the prisons as a no transmission area. The SR's are typically located as close as possible to the outside perimeter of the DGA near the widest dimensions of the DGA such that the entire DGA may be viewed from the directional antennas. It should be noted that if there are only two SR's the present invention will be able to triangulate to a point location anywhere in the DGA except along a line between the two SR's. Even with only two SR's, the present invention will still warn of a hostile transmitter in the DGA. To cover every point in the DGA, three, or more, SR's are required.

Background noise typically exists from distant transmitters 104 (none of which originates in the DGA). A transmitter physically located in the DGA is defined as hostile 103.

FIG. 1 is a schematic of the setup where:
$SR_i$=RF signal receiver 1
HT=a hostile transmitter (in the DGA)
BN=many background transmissions (typically from outside the DGA)

The MDA on each signal receiver contains M antennas. Since a signal may be sensed in more than one directional antenna in the MDA, the antenna with the strongest signal, at a given frequency and TOA, is assumed to be the approximate direction of the signal transmitter.

The signals received at each signal receiver are the summation of the background noise and a hostile transmission if a hostile transmission exists. Unfortunately they can't be separated by a signal receiver at a single instant in time to identify the hostile transmission component of the signal.

The present invention is a non-obvious way of identifying the signals that have, at least, some of the hostile transmissions present, as a component of the signal, and then of locating the hostile transmitter.

One should note, in FIG. 1, that receiver SRI will be sensing the background noise BN in the segment of the MDA positioned towards the BN and within any angle of the directional antennas alpha. If there is a hostile signal transmitter within the angle alpha, the total power of the signal received will be the background noise plus the hostile signal. Since the hostile signal transmission is closer than the background transmissions it should result in a significant increase in the accumulated power of all the signals detected within the angle alpha 105.

The present invention requires that the signal data is monitored by sampling the signal power level simultaneously in four dimensions:
1. Across the range of interest in the frequency domain
2. Discretely in the time domain
3. From each of at least two signal receivers
4. From each of the M direction finding antennas on each signal receiver.

Therefore the sampled data can be visualized as a four dimensional array $P(SR_l,A_j,f_k,t_i)$ where:
$P(SR_l,A_j,f_k,t_i)$=the power level collected by the $l^{th}$ SR on its $j^{th}$ antenna at the $k^{th}$ frequency collected at the TOA.
$SR_l$=The $l^{th}$ Signal Receiver for l=1 to L
$A_j$=The $j^{th}$ directional antenna for j=1 to M {M=the number of directional antennas in each SR}
$f_k$=the $k^{th}$ frequency collected for k=1 to N {N=the number of frequencies collected}
$t_i$=the time of arrival for i=1 to I {I=the number of times data was collected}

Typically the background power levels (i.e. noise) is comprised of many different sources (thermal noise, cell phones, Wi-Fi, etc.). Since there is no synchronization of the starting point of each background waveform the total composite power levels at any point in time and at every frequency will tend to be fairly constant, or at least with a small variance of the power levels such as seen in FIG. 2. Those power levels can be visualized as a random variable.

Then, when a hostile signal transmission occurs from within the DGA, it will typically add one or more bumps to the total background power level at specific frequencies such as seen in FIG. 3.

We can view the composite background noise power levels at each frequency as a random variable with a small variance. The method involves fitting a known probability density function to that random variable (for example, utilizing a Chi-Square analysis). Then we can select a one-tail confidence limit such as 99% to filter out all signals with power levels that are below that limit. All of the surviving signals will then contain the highest (i.e. 1%) peaks of the received signals. A few may also contain a hostile signal.

The cumulative power levels consist of many weak background signal transmissions and possibly one slightly stronger hostile signal transmission. The hostile signal transmission will tend to be stronger because it is typically in closer proximity to the SR's (i.e. in the DGA 101).

The present invention requires that a large amount of data be collected. However most of that data can be eliminated with a series of four filters in the monitoring process.

Filter 1: Discard all but the strongest signal from each directional antenna in each MDA in each SR. This quickly eliminates $(M-1)/M*100$ percent of the signals at each frequency where M=the number of directional antennas in the MDA.

Filter 2: Discard all surviving signals, after Filter 1, with power levels below the confidence limit at each frequency thus eliminating, i.e. 99% of all, the signals that survive Filter 1.

Filter 3: If any of the surviving signals, after Filter 2, from one SR can not be matched in time to a surviving signal from a second SR, then it too can be discarded.

Filter 4: If the intersection point of two paired surviving signals, after Filter 3, from two SR's falls outside the DGA then it can be discarded. Note: if no hostile transmissions exist then all remaining signals should be eliminated.

The estimated direction of the radio frequency transmitter with respect to the signal receiver is the centerline angle of the directional antenna with the highest power measurement of all the directional antennas. However since the power level of the adjacent directional antennas contains some additional information, one can utilize that information by improving the estimate of the actual direction of the radio frequency transmitter by calculating a corrected estimated angle of the radio frequency transmitter. This calculation uses the information displayed in FIG. 18 as:

$$Alpha'=Sum(P_i*Alpha_i)/Sum(P_i)$$

Where: $P_i$=the power level received on directional antenna i with centerline angle $a_i$.
Ai=the centerline angle of directional antenna i
Alpha'=the corrected estimated angle of the estimated direction of the radio frequency signal
This correction would be performed before applying Filter 1.

The paired surviving signals after Filter 4, if any, (and their intersection points) indicate a possible transmission from inside the DGA. The intersection points will form a cluster around a hostile transmitter location. A tight cluster indicates a static signal transmitter location 501. A trajectory of time sequenced points indicates the trajectory of a dynamic signal transmitter 502.

Older radio-controlled aircraft (drones) utilize fixed frequency RF transmitters which are relatively easy to spot with the present invention. Newer models that utilize Direct Sequence Spread Spectrum (DSSS) or Frequency Hopping Spread Spectrum (FHSS) are more difficult to detect. However, all three of these RF protocols as well as others will be detected by the present invention. If the drone aircraft is also transmitting RF signals (i.e. status or video) back to the transmitter then a second cluster will be formed and the trajectory of the drone will be visible when the time sequenced points in the second cluster are joined by connecting vectors 502. When a static cluster and/or a trajectory cluster is visible, see FIG. 5, then management can be alerted to take appropriate action.

The present invention is expected to capture only some of the hostile RF signal transmissions. This is sufficient to detect whether a hostile RF signal transmission is occurring but not what information is being transmitted. However, knowledge of the presence of a hostile transmitter is all that is needed for many applications. For example, the present invention can be utilized for the airport problem and the prison problem.

To summarize, the present invention appears to be the first to be able to detect and locate the source of the RF signal transmissions emitted from a hostile transmitter from within a predefined geographical area (DGA) in the presence of background noise regardless of the transmission protocol, past, present or yet to be defined.

Operation of the Present Invention

As shown in the accompanying drawings, the present invention is a system and method for detecting an RF signal transmitter operating inside a predefined geographical area. The operation of the present invention may be described as five processes:
1. The Definition Process
2. The Setup Process
3. The Initial Training Process
4. The Retraining Process
5. The Monitoring Process
   1. The definition process (FIG. 7) starts with defining a geographical area 700 in which no RF signal transmissions of a given frequency range 710 will be allowed. That area will be called the DGA 700. An example of such an area is the ground surrounding an airport or a prison. That area is designated as a no-fly zone for model aircraft, such as drones. A drone controlled or flying in that area will be considered hostile. The frequency range to be monitored must also be defined 710. For example, if the application is a no-fly zone for prisons or airports then the frequencies used for model airplane drones would be monitored.
   2. The setup process involves positioning the signal receivers 810 a distance apart from each other and near the perimeter of the DGA (101). The CPU (601) is typically located 820 inside a control room along with the optional display and the alarm. Multiple alarm(s), display(s) and camera(s) may also be located in other strategic areas 830. The memory, used to store and retrieve data, is typically coupled 840 with the CPU in the control room.
   3. The initial training process is needed to obtain statistical measures of the background noise in the DGA at each frequency. When it is confirmed that no hostile RF signal transmissions are present in the DGA 910, a sample of the power levels of the ambient signals from outside the DGA (the background noise) are recorded 920. Typically many low-level signals from many distant sources are present. The composite of these signals plus thermal noise constitutes background noise. The sample of power levels, at a given frequency, over time can be seen as a random variable (201). The mean and variance of the power levels of these signals is then calculated 930. The next step is to fit a known probability density function to the sample 940. A Chi-Square test may be used to select the best fit distribution. Then a one-tail confidence level, for each population of the noise samples is selected 950. The confidence limit may be in the area of 99%. Note, there is a sample of the signal power from each directional antenna, inside the MDA, for each signal receiver, for each frequency in the range of interest, and at each interval of time. The training process may be repeated as often as deemed necessary.
   4. The retraining process (FIG. 9B) is the same as the initial training process except that the step of verifying that no hostile transmission is present in the DGA has been eliminated. This process was described so that the retraining can be accomplished automatically with no human interface.
   5. The monitoring process continually 1000 captures signal data. The monitoring process includes four filters designed to eliminate signals that do not contain a hostile component. Filters 1 through 4 eliminate as many signals as possible to minimize the amount of data stored in memory. Any surviving paired signals and their intersection points (inside the DGA) are indicators of a suspected hostile transmission occurring in the DGA. The pattern of the surviving points may hold additional information. A tight cluster of points is indicative of a static control transmitter. A time sequence of points that form an approximate direction is indicative of feedback signal transmissions from a dynamic transmitter back to the static control transmitter such as, for example, the trajectory of a dynamic flying model aircraft (drone).

If no intersection points survive the set of filters (the majority of the time) then no hostile transmissions are assumed to be occurring in the DGA. When one or more points do survive then the alarm is activated. Various levels of automation may be utilized in different applications of this technology. A low-level automation would consist of an audible alarm sounded to cause humans to take appropriate action. A higher level of automation may use algorithms to form clusters of the intersection points and direct cameras to point and focus at the center of the static cluster(s), and to follow the trajectory of the dynamic cluster(s) before causing humans to take action.

CONCLUSION

To summarize, the present invention appears to be the first to be able to detect RF signal transmissions emitted from a hostile RF transmitter from within a predefined geographical area regardless of the transmission protocol, present or yet to be defined and to warn of their presence.

We claim:

1. A system to detect and locate a suspected radio frequency signal transmitter and to cause an action to occur when the suspected radio frequency signal transmitter is detected, the signal transmitter operating within the boundaries of a pre-defined geographical area, the system comprising:
   a plurality of at least two radio frequency signal receivers, each signal receiver equipped with a plurality of direction finding antennas, each direction finding antenna designed and constructed to receive radio frequency signals in a predefined range of frequencies, the at least two radio frequency signal receivers positioned near the predefined geographical area in an arrangement that allows the signal receivers to receive radio frequency signals from approximately every origin point inside the predefined geographical area, the attributes of the radio frequency signals comprising at least the signal time of arrival and the signal frequency and the signal receiver identification and the direction finding antenna identification and the signal power level, and each radio frequency signal receiver designed and constructed to determine the estimated direction of each received signal; and a memory, the memory for storing and for retrieving the radio frequency signal attributes;

an alarm, the alarm activated when a suspected radio frequency signal transmitter operating within the predefined geographical area is detected; and a memory controller, the memory controller operationally connected to the memory, the memory controller operationally connected to the alarm, the memory controller in communication with the signal receivers, the memory controller programmed for:

(I) performing a training process, the training process having a predetermined frequency of occurrence, the training process having a predefined duration of time, the training process consisting of two sub-processes, the first sub-process comprising receiving radio frequency signal attributes on the signal receivers and the building of sample populations of power levels in each classification of signal, the classifications consisting of, at least, the signal receiver identification, the directional antenna identification and the frequency of the signal and the second sub-process comprising the calculation of the mean and variance of the sample populations, and the fitting of a probability distribution to the sample populations, and the calculation of a one tail confidence limit of a predetermined amount for each sample population; and (II) performing a monitoring process, the monitoring process having a predetermined frequency of occurrence, the monitoring process having a predefined duration of time, the monitoring process comprising the steps of:

(i) receiving radio frequency signal attributes on the signal receivers; and (ii) calculating the estimated direction of the received signal on the signal receiver; and (iii) retaining the signal attributes of the direction finding antenna with the maximum power level in each signal receiver and discarding the remaining signal attributes in the signal receiver; and (iv) discarding all signal attributes with power levels below the one tailed confidence limit, leaving a second set of surviving signal attributes, and (v) matching the signal attributes, from the second set of surviving signal attributes, across all combinations of signal receivers by time interval and frequency interval, the matched signal attributes forming a matched pair, and (vi) discarding the signal attributes that are not in at least one matching pair leaving a third set of surviving signal attributes, and (vii) calculating the intersection points of the two lines radiating from each signal receiver having a matched pair with another signal receiver, in the direction of the estimated direction of the received signal, the intersection point giving a possible location of a radio frequency signal transmitter; and storing the intersection points in a first set of intersection point attributes;

(viii) discarding the intersection point attributes that are not in the predefined geographical area leaving a second set of surviving intersection points; and (ix) determining whether the second set of surviving intersection point attributes in the predefined geographical area are indicative of a suspected signal transmitter, and discarding the intersection point attributes that are not indicative of a suspected signal transmitter leaving a third set of surviving intersection point attributes; and (x) activating the alarm to report the suspected signal transmitter locations as indicated by the third set of surviving intersection points;

whereby the retained intersection points are the suspected radio frequency transmitters operating within the predefined geographical area, whereafter the alarm is activated.

2. The system of claim 1, further comprises at least one display which shows the predefined geographical area and shows the locations of the suspected radio frequency signal transmitters operating within the boundaries of the predefined geographical area.

3. The system of claim 1, further comprises at least one camera, the camera for monitoring the predefined geographical area and for verifying the location of any suspected radio frequency signal transmitters operating within the boundaries of the pre-defined geographical area.

4. The system of claim 1, wherein the estimated direction is selected from a group consisting of the centerline angle of the directional antenna in the signal receiver with the maximum power and the power weighted average of all directional antenna centerline angles in the signal receiver.

5. A method to detect and locate a suspected radio frequency signal transmitter and to cause an action to occur when the suspected radio frequency signal transmitter is detected, the signal transmitter operating within the boundaries of a predefined geographical area, the method comprising:

providing a plurality of at least two radio frequency signal receivers, each signal receiver equipped with a plurality of direction finding antennas, each direction finding antenna designed and constructed to receive radio frequency signals in a predefined range of frequencies, the at least two radio frequency signal receivers positioned near the predefined geographical area in an arrangement that allows the signal receivers to receive radio frequency signals from approximately every origin point inside the predefined geographical area, the attributes of the radio frequency signals comprising at least the signal time of arrival and the signal frequency and the receiver identification and the direction finding antenna identification and the signal power level, and each radio frequency signal receiver designed and constructed to determine the estimated direction of each received signal; and providing a memory, the memory for storing and for retrieving the radio frequency signal attributes; and providing an alarm, the alarm activated when a suspected radio frequency signal transmitter operating within the predefined geographical area is detected; and providing a memory controller, the memory controller operationally connected to the memory, the memory controller operationally connected to the alarm, the memory controller in communication with the signal receivers, the memory controller for:

(I) performing a training process, the training process having a predetermined frequency of occurrence, the training process having a predefined duration of time, the training process consisting of two sub-processes, the first sub-process comprising receiving radio frequency signal attributes on the signal receivers and the building of sample populations of power levels in each classification of signal, the classifications consisting of, at least, the signal receiver identification, the directional antenna identification and the frequency of the signal and the second sub-process comprising the calculation of the mean and variance of the sample populations, and the fitting of a probability distribution to the sample populations, and the calculation of a one tail confidence limit of a predetermined amount for each sample population; and (II) performing a monitoring process, the monitoring process having a predetermined frequency of occurrence, the monitoring process having a predefined duration of time, the monitoring process comprising the steps of:

(i) receiving radio frequency signal attributes on the signal receivers; and (ii) calculating the estimated direction of the received signal on the signal receiver; and (iii) retaining the signal attributes of the direction finding antenna with the maximum power level in each signal receiver and discarding the remaining signal attributes in the signal receiver; and (iv) discarding all signal attributes with power levels below the one tailed confidence limit, leaving a second set of surviving signal attributes, and (v) matching the signal attributes, from the second set of surviving signal attributes, across all combinations of signal receivers by time interval and frequency interval, the matched signal attributes forming a matched pair, and (vi) discarding the signal attributes that are not in at least one matching pair leaving a third set of surviving signal attributes, and (vii) calculating the intersection points of the two lines radiating from each signal receiver having a matched pair with another signal receiver, in the direction of the estimated direction of the received signal, the intersection point giving a possible location of a radio frequency signal transmitter; and storing the intersection points in a first set of intersection point attributes;

(viii) discarding the intersection point attributes that are not in the predefined geographical area leaving a second set of surviving intersection points; and (ix) determining whether the second set of surviving intersection point attributes in the predefined geographical area are indicative of a suspected signal transmitter, and discarding the intersection point attributes that are not indicative of a suspected signal transmitter leaving a third set of surviving intersection point attributes; and (x) activating the alarm to report the suspected signal transmitter locations as indicated by the third set of surviving intersection points;

whereby the method will detect and locate a suspected radio frequency signal transmitter operating within the boundaries of the pre-defined geographical area and cause the alarm to be activated.

6. The method of claim 5, further comprises providing at least one display, the display for showing the predefined geographical area and for showing the locations of the suspected radio frequency signal transmitters operating within the boundaries of the pre-defined geographical area.

7. The method of claim 5, further comprises providing at least one camera, the camera for monitoring the predefined geographical area and for verifying the location of any suspected radio frequency signal transmitters operating within the boundaries of the pre-defined geographical area.

8. The method of claim 5, wherein the estimated direction is selected from a group consisting of the centerline angle of the directional antenna in the signal receiver with the maximum power and the power weighted average of all directional antenna centerline angles in the signal receiver.

* * * * *